(12) United States Patent
Fu et al.

(10) Patent No.: US 12,072,207 B1
(45) Date of Patent: Aug. 27, 2024

(54) RANGE FINDING BINOCULAR TELESCOPE

(71) Applicant: SHENZHEN RUIERXING ELECTRONIC CO., LTD., Guangdong (CN)

(72) Inventors: Luxin Fu, Guangdong (CN); Zhicheng Xing, Guangdong (CN)

(73) Assignee: SHENZHEN RUIERXING ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/200,486

(22) Filed: May 22, 2023

(30) Foreign Application Priority Data

Apr. 7, 2023 (CN) .......................... 202310384130.9

(51) Int. Cl.
*G01C 3/04* (2006.01)
*G02B 23/04* (2006.01)
*G02B 23/18* (2006.01)

(52) U.S. Cl.
CPC .............. *G01C 3/04* (2013.01); *G02B 23/04* (2013.01); *G02B 23/18* (2013.01)

(58) Field of Classification Search
CPC ........ G02B 23/18; G02B 23/02; G02B 23/24; G02B 23/10; G02B 23/105; G02B 23/12; G02B 7/12; G02B 7/003; G02B 27/10; G02B 27/141; G02B 27/144; F41G 3/06; F41G 3/065; G01C 3/04
See application file for complete search history.

(56) References Cited

U.S. PATENT DOCUMENTS

| | | | | |
|---|---|---|---|---|
| 5,235,458 | A * | 8/1993 | Akagi .................... | G02B 23/18 359/410 |
| 5,644,425 | A * | 7/1997 | Palmer ................... | G02B 23/16 359/410 |
| 6,441,887 | B1 * | 8/2002 | Kao ....................... | G01C 15/002 356/5.1 |
| 8,525,978 | B2 * | 9/2013 | Lancaster ............. | G01S 7/4812 356/5.01 |
| 10,520,717 | B2 * | 12/2019 | Chen ..................... | G01S 7/4812 |
| 2005/0128576 | A1 * | 6/2005 | Perger .................... | G01C 3/04 359/407 |
| 2009/0116105 | A1 * | 5/2009 | Lee ........................ | G02B 23/18 359/407 |

(Continued)

FOREIGN PATENT DOCUMENTS

FR 3119671 A1 * 8/2022
WO WO-2022021250 A1 * 2/2022 ............. F41G 1/473

*Primary Examiner* — Derek S. Chapel

(57) ABSTRACT

A range finding binocular telescope comprising a first lens body and a second lens body, the first lens body and the second lens body rotating about a central shaft, wherein the first lens body comprises a first lens tube, and a first eyepiece group and a laser transmitting module disposed in the first lens tube, the second lens body comprises a second lens tube, and a second eyepiece group and a laser receiving module disposed in the second lens tube, the laser transmitting module is arranged in front of the first eyepiece group, the laser receiving module is arranged in front of the second eyepiece group, a laser light path for range finding is separated from an observing light path, and the laser light path and the observing light path is capable of being independently adjusted.

8 Claims, 3 Drawing Sheets

(56) References Cited

U.S. PATENT DOCUMENTS

| | | | | |
|---|---|---|---|---|
| 2009/0266892 | A1* | 10/2009 | Windauer | F41G 3/06 |
| | | | | 235/404 |
| 2009/0296210 | A1* | 12/2009 | Schlierbach | F41G 3/065 |
| | | | | 359/429 |
| 2012/0098972 | A1* | 4/2012 | Hansen | G06F 18/22 |
| | | | | 348/E5.09 |
| 2016/0187131 | A1* | 6/2016 | Chang | G02B 23/14 |
| | | | | 356/4.01 |
| 2018/0106612 | A1* | 4/2018 | Mingshu | G02B 23/18 |
| 2023/0075072 | A1* | 3/2023 | Chuang | G01C 15/008 |
| 2023/0359014 | A1* | 11/2023 | Zhu | G02B 27/10 |

\* cited by examiner

RANGE FINDING BINOCULAR TELESCOPE

CROSS-REFERENCE TO RELATED APPLICATIONS

The present application claims priority of Chinese Patent Application No. 202310384130.9, filed on Apr. 7, 2023, the entire contents of which are hereby incorporated by reference.

TECHNICAL FIELD

The present invention relates to the field of photoelectric technology, and particularly to a range finding binocular telescope.

DESCRIPTION OF THE PRIOR ART

In a typical range finding binocular telescope, a laser transmitting path and a laser receiving path for laser distance measuring are mixed in a prism group. The laser transmitting path and laser receiving path pass through too many surfaces via the prism group, resulting in a significant decrease in laser power. When an object at long-distance is measured, it is necessary to increase laser power. However, the increased laser power increases a risk of laser path leakage to the eyepiece group due to the laser transmitting path mixed in the prism group; moreover, adjustments of the typical range finding binocular telescope are too complicated due to the mixing of the laser path and observation light path.

SUMMARY OF THE DISCLOSURE

In view of the above, the present invention provides a range finding binocular telescope capable of solving or optimizing the above problems.

The present invention provides a range finding binocular telescope comprising a first lens body and a second lens body, the first lens body and the second lens body rotating about a central shaft, wherein the first lens body comprises a first lens tube, and a first eyepiece group and a laser transmitting module disposed in the first lens tube, the second lens body comprises a second lens tube, and a second eyepiece group and a laser receiving module disposed in the second lens tube, the laser transmitting module is arranged in front of the first eyepiece group, the laser receiving module is arranged in front of the second eyepiece group, a laser light path for range finding is separated from an observing light path, and the laser light path and the observing light path is capable of being independently adjusted.

In some embodiments, the laser transmitting module is mounted in the first lens tube through a laser transmitting module ball head, and the laser transmitting module comprises a laser transmitting module base and a laser transmitting unit mounted in the laser transmitting module base.

In some embodiments, the laser transmitting unit comprises a laser emitter for transmitting laser beams, a collimating lens for collimating the emitted laser beams, a first laser mirror for reflecting the collimated laser beams, a first dichroic mirror for reflecting laser light and allowing natural light to pass therethrough, and a first convex lens for focusing.

In some embodiments, the collimating lens is mounted in a first focal length adjusting member, and the first focal length adjusting member is mounted on the laser transmitting module base.

In some embodiments, the collimating lens is positioned in front of the laser emitter to form a laser transmitting group, and the first laser mirror and the first dichroic mirror are opposed to each other to form a laser guiding group, and the laser guiding group is arranged in front of the laser transmitting group.

In some embodiments, the laser emitter, the collimating lens, the first laser mirror, and the first dichroic mirror are mounted inside a rear end of the laser transmitting module base, and the first convex lens is mounted inside a front end of the laser transmitting module base.

In some embodiments, the laser transmitting module base is provided with the laser transmitting module ball head protruding outward at an outer side corresponding to a position of the first convex lens.

In some embodiments, the laser transmitting module base is mounted in the first lens body through a laser transmitting module ball head ring.

In some embodiments, the laser receiving module is mounted in the second lens tube through a laser receiving module ball head, and the laser receiving module comprises a laser receiving module base and a laser receiving unit mounted in the laser receiving module base.

In some embodiments, the laser light receiving unit comprises a second convex lens for focusing, a second dichroic mirror for reflecting the laser beams turned back from the target and allowing natural light to pass therethrough, a second laser mirror for reflecting the reflected laser beams from the second dichroic mirror, a laser receiving coupling mirror for receiving and focusing the laser beams reflected by the second laser mirror, and a laser receiver for receiving the focused laser beams.

In some embodiments, the laser receiving coupling mirror is mounted in a second focal length adjusting member, and the second focal length adjusting member is mounted on the laser receiving module base.

In some embodiments, the laser receiving coupling mirror is positioned in front of the laser receiver to constitute a laser receiving group, and the second laser mirror and the second dichroic mirror are opposed to each other to constitute a laser guiding group, wherein the laser guiding group is arranged in front of the laser receiving group.

In some embodiments, the second dichroic mirror, the second laser mirror, the laser receiving coupling mirror, and the laser receiver are mounted inside a rear end of the laser receiving module base, and the second convex lens is mounted inside a front end of the laser receiving module base.

In some embodiments, the laser receiving module base is provided with the laser receiving module ball head protruding outward at an outer side corresponding to a position of the second convex lens.

In some embodiments, the laser receiving module base is mounted in the second lens body through a laser receiving module ball head ring.

In some embodiments, the laser beams emitted to the target by the laser transmitting module and light in the observing light path band are focused by the second convex lens and then projected onto the second dichroic mirror in the laser receiving module, and a coating film of the first dichroic mirror transmits light of normal observing light path band to the first prism group at a rear end, and a coating film of the second dichroic mirror transmits the light of the normal observing light path band to the second prism group at a rear end, and laser light of a specific wavelength band of a laser transmitting is reflected toward the second laser mirror, and the second laser mirror projects the received laser light toward the laser receiver.

In some embodiments, the first prism group is mounted in a first prism group ball head and is mounted on the first lens body through a first prism group ball head ring, and the second prism group is mount in a second prism group ball head and is mounted in the second lens body through a second prism group ball head ring.

In some embodiments, a display group is mounted on a specific focal point of the first eyepiece group and the second eyepiece group, respectively, so that a ranging center and ranging data are capable of being displayed in eyes together with an observing image, and a center of the display group is capable of being rotated and moved in the first lens body and the second lens body.

In some embodiments, the display group is a liquid crystal display group.

In some embodiments, the central shaft is sleeved with a sleeve.

Compared with the prior art, the advantageous effects of the present invention are that:

In the present invention, the laser receiving and transmitting path and the visual observing light path are separated into two independent systems, and after the laser light path and the observing light path are separated, the total laser power of the laser light path is higher under the same laser transmitting power.

In the present invention, the number of reflect surfaces through which the laser transmitting and receiving paths are separated is reduce, the laser power is improved, and the risk of leakage of the laser light paths to the observing light paths is reduced after the laser light paths are separated.

3. After the laser light path and the observing light path are independent, the adjustment of the laser light path and the observing light path are divided into two independent systems, and the two systems can move independently to reduce the adjustment difficulty so that adjustment in a production link is greatly simplified.

Figure 1:
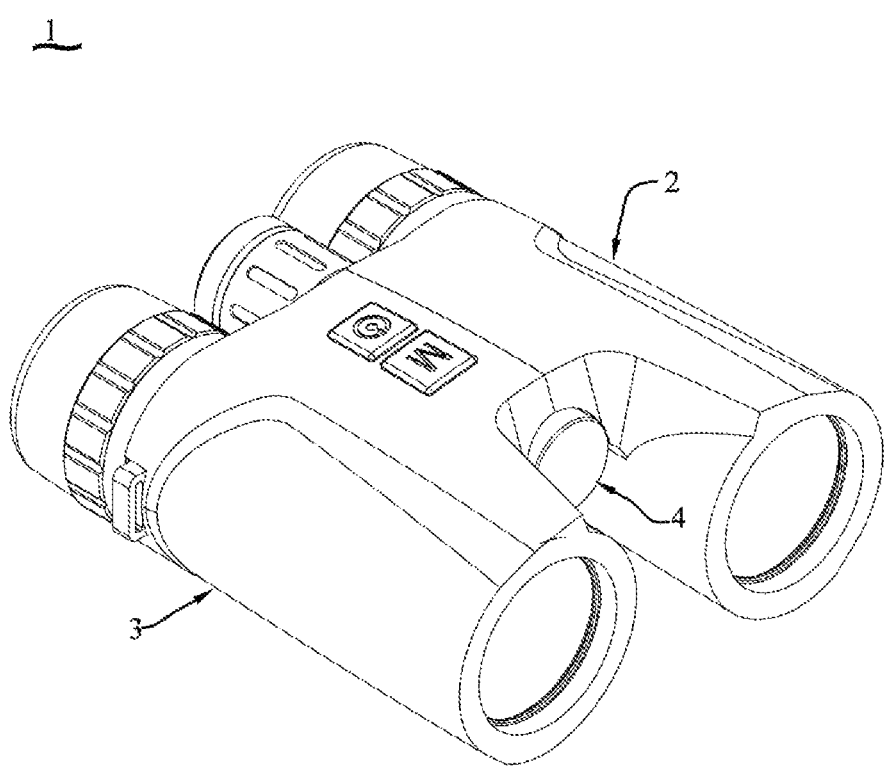
FIG. 1 shows a perspective view of a range finding binocular telescope according to an embodiment of the present invention.

Reference numerals: 1—range finding binocular telescope; 2—first lens body; 20—first lens tube; 21—first eyepiece group; 22—laser transmitting module; 221—laser emitter; 222—first focal length adjusting member; 223—collimating lens; 224—first dichroic mirror; 225—first laser mirror; 226—laser transmitting module base; 227—laser transmitting module ball head; 228—first convex lens; 229—laser transmitting module ball head ring; 220—laser transmitting path; 23—display group; 24—first prism group; 241—first prism group ball head ring; 242—first prism group ball head; 3—second lens body; 30—second lens tube; 31—second eyepiece group; 32—laser receiving module; 321—laser receiver; 322—second focal length adjusting member; 323—laser receiving coupling lens; 324—second dichroic mirror; 325—second laser mirror; 326—laser receiving module base; 327—laser receiving module ball head; 328—second convex lens; 329—laser receiving module ball head ring; 320—laser receiving path; 34—second prism group; 341—second prism group ball head ring; 342—second prism group ball head; 4—central shaft; 40—sleeve.

DESCRIPTION OF EMBODIMENTS

In order to facilitate understanding of the present invention, the present invention will now be described more fully with reference to the drawings. One or more embodiments of the present invention are shown by way of example in the drawings, in order to provide a more accurate and thorough understanding of the disclosed technical solution. However, it should be understood that the present invention may be realized in many different forms and is not limited to the embodiments described below.

Figure 2:
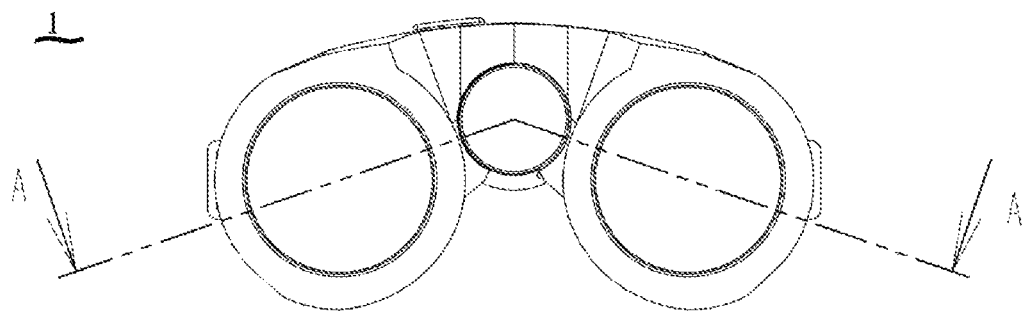
FIG. 2 shows a cross-sectional view along A-A of the range finding binocular telescope shown in FIG. 1.
Figure 2:
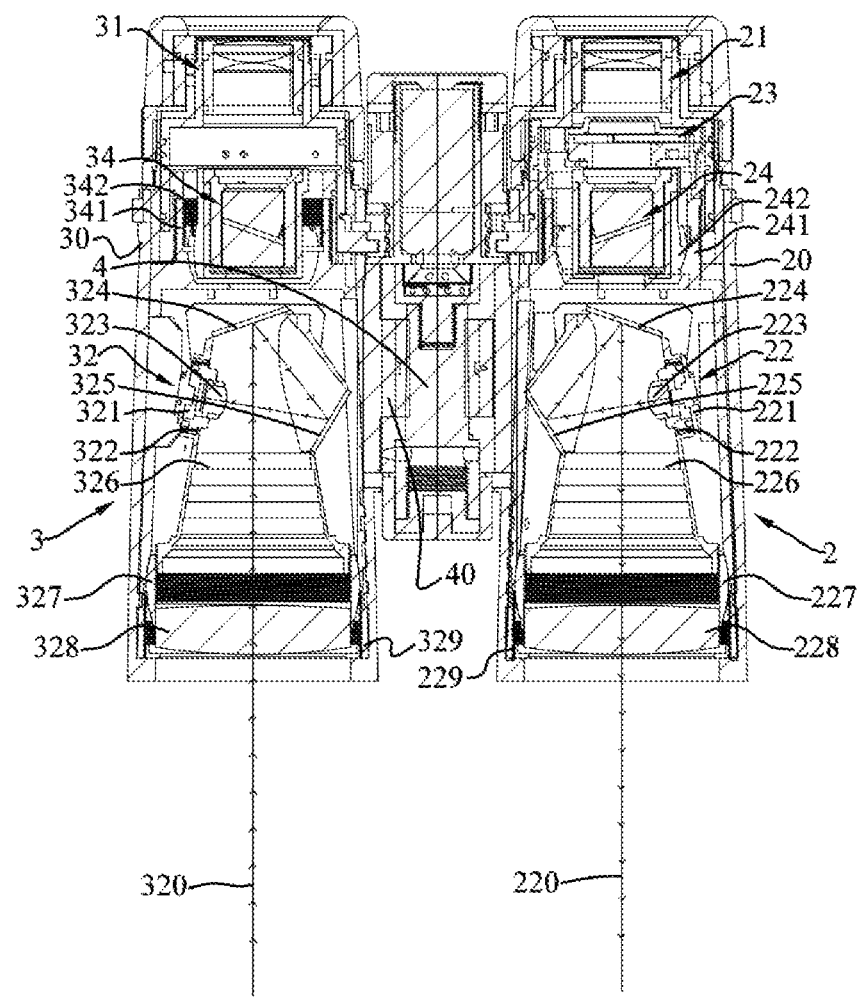
Figure 3:
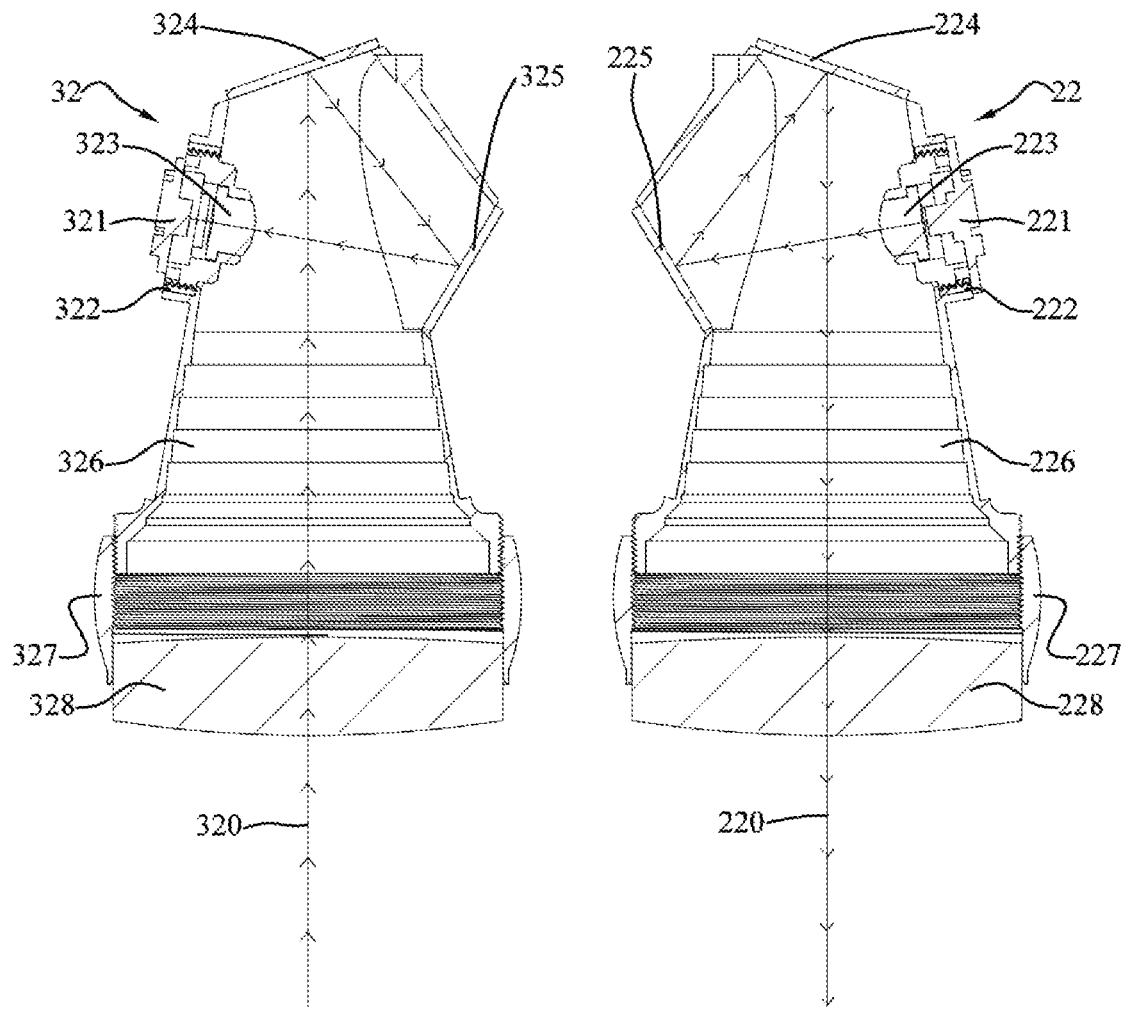
FIG. 3 shows a schematic plan view of a laser transmitting path and a laser receiving path of the range finding binocular telescope shown in FIG. 1.

Referring also to FIGS. 1 to 3, a range finding binocular telescope 1 according to an embodiment of the present invention includes a first lens body 2 and a second lens body 3, wherein the first lens body 2 and the second lens body 3 rotate about a central shaft 4. The central shaft 4 is sleeved with a sleeve 40. Preferably, the sleeve 40 is mounted on the second lens body 3, the second lens body 3 and the first lens body 2 are connected with each other through the central shaft 4 to form a left-right lens structure of the binocular telescope, in which the first lens body 2 is a relatively fixed member, and the second lens body 3 is rotated around the first lens body 2 through the central shaft 4. Rotation of the first lens body 2 and the second lens body 3 about the central shaft 4 produces a unique focal point at a specific focal length. In the first lens body 2, a laser transmitting path can be adjusted by rotating and swinging to coincide with the unique focal point on the specific focal length. Similarly, a laser receiving path can also coincide with the focal point. In this way, a distance measuring operation is still possible when the binocular telescope 1 perform a pupil distance adjustment.

In this embodiment, the first lens body 2 includes a first lens tube 20, and a first eyepiece group 21 and a laser transmitting module 22 disposed in the first lens tube 20. The second lens body 3 includes a second lens tube 30, and a second eyepiece group 31 and a laser receiving module 32 disposed in the second lens tube 30. The laser transmitting module 22 is configured to emit desired laser beams and transmit the laser beams to a target. The laser receiving module 32 is configured to receive the laser beams reflected from the target.

In this embodiment, the laser transmitting module 22 is mounted in the first lens tube 20 with a laser transmitting module ball head 227. The laser transmitting module 22 includes a laser transmitting module base 226 and a laser transmitting unit mounted in the laser transmitting module base 226. The laser transmitting module base 226 is hollow. In the description of orientation herein, a direction adjacent/toward the target is defined as forward and a direction away from the target is defined as rearward.

The laser transmitting unit includes a laser emitter 221 for transmitting laser beams, a collimating lens 223 for collimating the emitted laser beams, a first laser mirror 225 for reflecting the collimated laser beams, a first dichroic mirror 224 for reflecting laser light and allowing natural light to pass therethrough, and a first convex lens 228 for focusing. The laser emitter 221, the collimating lens 223, the first laser mirror 225, and the first dichroic mirror 224 of the laser transmitting unit are mounted inside a rear end of the laser transmitting module base 226, and the first convex lens 228 is mounted inside a front end of the laser transmitting module base 226. Preferably, the laser transmitting module base 226 is provided with a laser transmitting module ball head 227 protruding outward at an outer side corresponding to a position of the first convex lens 228. The first convex lens 228 (or convex lens group) is bonded to the laser transmitting module ball head 227. The collimating lens 223 is mounted in a first focal length adjusting member 222 mounted on the laser transmitting module base 226. A focal length of a laser emission can be finely adjusted by threads of the first focal length adjusting member 222 and the laser transmitting module base 226. The collimating lens 223 is positioned in front of the laser emitter 221 to form a laser transmitting group, and the first laser mirror 225 and the first dichroic mirror 224 are opposed to each other to form a laser guiding group. The laser guiding group is arranged in front of the laser transmitting group. In the embodiment, the first laser mirror 225 is capable of totally reflecting the laser beams. The laser light emitted from the laser emitter 221 is collimated by the collimating lens 223, reaches the first laser mirror 225 and is reflected by the first laser mirror 225, and reaches the first dichroic mirror 224, and then is reflected again to pass through the first convex lens 228 to reach the target. Alternatively, the optical path formed by the first dichroic mirror and the first laser mirror may be replaced by using only the first dichroic mirror to form the laser reflecting optical path; alternatively, the optical path formed by the first dichroic mirror and the first laser mirror may be replaced by a prism.

The laser emitter 221 directs laser light through the collimating lens 223 to the first laser mirror 225, and the first laser mirror 225 reflects the laser light to the first dichroic mirror 224 which adopts narrow-band coating film and can reflect 99% of the laser light of the specified wavelength of the laser emitter 221 to the first convex lens 228 or the convex lens group, the laser light is converged to the target through the first convex lens 228 or the convex lens group, wherein the total focal length can be adjusted by the threads on the laser transmitting module ball head 227 and the threads on the laser transmitting module base 226. Now, a laser transmitting path 220 is created. The laser transmitting path 220 is mounted in the first lens body 2 through a laser transmitting module ball head ring 229, and the laser transmitting path 220 can be rotated and swung in the first lens body 2.

In this embodiment, the laser receiving module 32 is mounted in the second lens tube 30 through a laser receiving module ball head 327. The laser receiving module 32 includes a laser receiving module base 326 and a laser receiving unit mounted in the laser receiving module base 326. The laser receiving module base 326 is hollow.

The laser receiving unit includes a second convex lens 328 for focusing, a second dichroic mirror 324 for reflecting the laser beams turned back from the target and allowing natural light to pass therethrough, a second laser mirror 325 for reflecting the reflected laser beams from the second dichroic mirror 324, a laser receiving coupling lens 323 for receiving and focusing the reflected laser beams from the second laser mirror 325, and a laser receiver 321 for receiving the focused laser beams. The second dichroic mirror 324, the second laser mirror 325, the laser receiving coupling lens 323, and the laser receiver 321 of the laser receiving unit are mounted inside a rear end of the laser receiving module base 326, and the second convex lens 328 is mounted inside a front end of the laser receiving module base 326. Preferably, the laser receiving module base 326 is provided with a laser receiving module ball head 327 protruding outward at an outer side corresponding to a position of the second convex lens 328. The second convex lens 328 (or convex lens group) is bonded to the laser receiving module ball head 327. In the first eyepiece group 21, a focus adjusting hand wheel drives an eyepiece adjusting mechanism to move the first eyepiece group 21 and the first convex lens 228 (or convex lens group) to generate a focus movement, and in the second eyepiece group 31, a focus adjusting hand wheel drives the eyepiece adjusting mechanism to move the second eyepiece lens group 31 and the second convex lens 328 (or convex lens group) to generate a focus movement, observing light path after the change of the total focal length allows a user to view objects at close and distant distances.

In the embodiment, the laser receiver 321 converts the received optical signal into an electrical signal. The laser light emitted by the laser transmitting unit is reflected by the target, focused by the laser receiving coupling lens 323, and reaches the laser receiver 232. The laser receiving coupling lens 323 is mounted in a second focal length adjusting member 322 mounted on the laser receiving module base 326, wherein the focal length of the laser receiver can be finely adjusted by the threads of the second focal length adjusting member 322 and the laser receiving module base 326. The laser receiving coupling lens 323 is positioned in front of the laser receiver 321 to constitute a laser receiving group, and the second laser mirror 325 and the second dichroic mirror 324 are opposed to each other to constitute a laser guiding group, wherein the laser guiding group is arranged in front of the laser receiving group. In this embodiment, the second laser mirror 325 is capable of totally reflecting the laser beams. The laser light reflected by the target passes through the second convex lens 328, reaches the second dichroic mirror 324, is reflected by the second laser mirror 325, and then reaches the laser receiving coupling lens 323, and finally, the laser receiver 321 receives the laser light. Thereby, a laser receiving path 320 is generated.

Specifically, the laser transmitting path 220 emits laser light to the target, and the laser light reflected from the target passes through the second convex lens 328 and reaches the second dichroic mirror 324 which adopts narrow-band coating film and can reflect 99% of the laser light of the specified wavelength of the laser emitter 221 to the second laser mirror 325, and then converge the laser light to be received by the laser receiver 321 through the laser receiving coupling lens 323, wherein the total focal length can be adjusted by threads on the laser receiving module ball head 327 and the laser receiving module base 326. Now, the laser receiving path 320 is generated. The laser receiving path 320 is mounted in the second lens body 3 through the laser receiving module ball head ring 329, and the laser receiving path 320 can be rotated and swung in the second lens body 3.

Preferably, the first dichroic mirror 224 and the second dichroic mirror 324 are coated in the same manner, and both have the function of reflecting as many specific wavelength band lasers as possible to participate in the ranging work. In the embodiment, the laser receiving path 320 converges the laser light emitted to the target by the laser transmitting path 220 and the light in the normal observing light path band through the second convex lens 328 or the convex lens group, and then projects the converged light to the second dichroic mirror 324. At this time, the coating film of the first dichroic mirror 224 transmits wavelength band 450 nm to 750 nm of the normal observing light path to the first prism group 24 at the rear end, and the coating film of the second dichroic mirror 324 transmits the wavelength band 450 nm to 750 nm of the normal observing light path to the second prism group 34 at the rear end. The laser light of the specific wavelength band of the laser emitter 221 is reflect to the second laser mirror 325, and the second laser mirror 325 projects the received laser light toward the laser receiver 321. At this time, separate laser transmitting path 220 and laser receiving path 320 are generated.

All light except for the specific wavelength band laser light is transmitted to the first prism group 24 and the second prism group 34, thereby separating a laser ranging optical path in front of the prism group. In other words, the laser light path for range finding is separated in front of the first prism group 24 and the second prism group 34, and the laser light path and the observing light path can be independently adjusted. Preferably, the first prism group 24 and the second prism group 34 have the same configuration.

In this embodiment, the first prism group 24 is mount in a first prism group ball head 242, and then is mounted in the first lens body 2 by a first prism group ball head ring 241. The second prism group 34 is mounted in the second prism group ball 342, and then is mounted in the second lens body 3 by a second prism group ball head ring 341. The first prism group ball head 242 can be rotated and swung in the first lens body 2, and the second prism group ball head 342 can be rotated and swung in the second lens body 3. When the first lens body 2 and the second lens body 3 are rotated about the central shaft 4, convergence and divergence, that is, a focus shift, occur for the observing light path. The first prism group ball head 242 and the second prism group ball head 342 can be rotated and swung to adjust the convergence and divergence of the observing light path so that focal points of the observing light path coincide. The observing light path adjusted by the first prism group 24 and the second prism group 34 is imaged in eyes through the first eyepiece group 21 and the second eyepiece group 31.

A display groups 23 is mounted on specific focal points of the first eyepiece group 21 and the second eyepiece group 31, respectively. In the embodiment, the display group 23 is mounted on a specific focal point of the first eyepiece group 21 or the second eyepiece group 31 so that a ranging center and ranging data can be displayed in the eyes together with the observing image, and a center of the display group 23 can be rotated and moved in the corresponding first lens body 2 and second lens body 3, so that the laser transmitting path 220 can be coincided with a center in the observing light path, that is, the center of the display group 23 coincides with the center of the laser transmitting path 220. Preferably, the display group 23 is a liquid crystal display group. As an eyesight of user is not uniform, a vision adjusting hand wheel can drive a vision adjusting mechanism to move the focal length of the eyepiece group and the liquid crystal display group, so that the visibility can also be adjusted appropriately to the user's eyes.

In the range finding binocular telescope provided by the present invention, the laser optical path and the observing optical path are separated, the total laser power of the laser optical path is higher under the same laser tube emission power; and a risk of the laser light path leaking out to the observing light path is reduced, and adjustment in a production link is greatly simplified.

The above is only preferred embodiments of the present invention, and is not intended to limit the present invention. Any simple change or equivalent replacement of the technical solution that can be easily obtained by any person familiar with the technical field within the technical scope disclosed by the invention falls within the protection scope of the invention.

What is claimed is:

1. A range finding binocular telescope, comprising: a first lens body and a second lens body, the first lens body and the second lens body rotating about a central shaft, wherein the first lens body comprises a first lens tube, and a first eyepiece group and a laser transmitting module disposed in the first lens tube, the second lens body comprises a second lens tube, and a second eyepiece group and a laser receiving module disposed in the second lens tube, the laser transmitting module is arranged in front of the first eyepiece group, the laser receiving module is arranged in front of the second eyepiece group, a first prism group is provided between the first eyepiece group and the laser transmitting module, a second prism group is provided between the second eyepiece group and the laser receiving module, a laser light path for range finding is separated from an observing light path in front of the first prism group and the second prism group, and the laser light path and the observing light path are adjustable independently:

wherein the laser transmitting module is mounted in the first lens tube through a laser transmitting module ball head, and the laser transmitting module comprises a laser transmitting module base and a laser transmitting unit mounted in the laser transmitting module base; the laser transmitting unit comprises a laser emitter for transmitting laser beams, a collimating lens for collimating the emitted laser beams, a first laser mirror for reflecting the collimated laser beams, a first dichroic mirror for reflecting laser light and allowing natural light to pass therethrough, and a first convex lens for focusing; the collimating lens is mounted in a first focal length adjusting member, and the first focal length adjusting member is mounted on the laser transmitting module base; the laser transmitting module base is mounted in the first lens body through a laser transmitting module ball head ring;

wherein the laser receiving module is mounted in the second lens tube through a laser receiving module ball head, and the laser receiving module comprises a laser receiving module base and a laser receiving unit mounted in the laser receiving module base; the laser receiving unit comprises a second convex lens for focusing, a second dichroic mirror for reflecting the laser beams turned back from the target and allowing natural light to pass therethrough, a second laser mirror for reflecting the reflected laser beams from the second dichroic mirror, a laser receiving coupling lens for receiving and focusing the laser beams reflected by the second laser mirror, and a laser receiver for receiving the focused laser beams; the laser receiving coupling lens is mounted in a second focal length adjusting member, and the second focal length adjusting member is mounted on the laser receiving module base; the laser receiving module base is mounted in the second lens body through a laser receiving module ball head ring;

wherein the laser beams emitted to the target by the laser transmitting module and light in an observing light path band are focused by the second convex lens and then projected onto the second dichroic mirror in the laser receiving module, and a coating film of the first dichroic mirror transmits light of the observing light path band to the first prism group at a rear end, and a coating film of the second dichroic mirror transmits the light of the observing light path band to the second prism group at a rear end, and laser light of a specific wavelength band of the laser emitter is reflected toward the second laser mirror, and the second laser mirror projects the received laser light toward the laser receiver; and wherein the first prism group is mounted in a first prism group ball head and is mounted on the first lens body through a first prism group ball head ring, and the second prism group is mounted in a second prism group ball head and is mounted in the second lens body through a second prism group ball head ring.

2. The range finding binocular telescope according to claim 1, wherein the collimating lens is positioned in front of the laser emitter to form a laser transmitting group, and the first laser mirror and the first dichroic mirror are opposed to each other to form a laser guiding group, and the laser guiding group is arranged in front of the laser transmitting group.

3. The range finding binocular telescope according to claim 1, wherein the laser emitter, the collimating lens, the first laser mirror, and the first dichroic mirror are mounted inside a rear end of the laser transmitting module base, and the first convex lens is mounted inside a front end of the laser transmitting module base.

4. The range finding binocular telescope according to claim 1, wherein the laser transmitting module base is provided with the laser transmitting module ball head protruding outward at an outer side corresponding to a position of the first convex lens.

5. The range finding binocular telescope according to claim 1, wherein the laser receiving coupling lens is positioned in front of the laser receiver to constitute a laser receiving group, and the second laser mirror and the second dichroic mirror are opposed to each other to constitute a laser guiding group, wherein the laser guiding group is arranged in front of the laser receiving group.

6. The range finding binocular telescope according to claim 1, wherein the second dichroic mirror, the second laser mirror, the laser receiving coupling lens, and the laser receiver are mounted inside a rear end of the laser receiving module base, and the second convex lens is mounted inside a front end of the laser receiving module base.

7. The range finding binocular telescope according to claim 1, wherein the laser receiving module base is provided with the laser receiving module ball head protruding outward at an outer side corresponding to a position of the second convex lens.

8. The range finding binocular telescope according to claim 1, wherein the central shaft is sleeved with a sleeve.

* * * * *